INVENTOR.
ARTHUR E. VOGEL
BY
ATTORNEYS

Oct. 8, 1968　　　　　　　A. E. VOGEL　　　　　3,404,898
CONTROL SYSTEM FOR VEHICLE SUSPENSION
Original Filed Oct. 19, 1955　　　　　　　　　　5 Sheets-Sheet 2

INVENTOR.
ARTHUR E. VOGEL
BY
ATTORNEYS

INVENTOR.
ARTHUR E. VOGEL
BY
ATTORNEYS

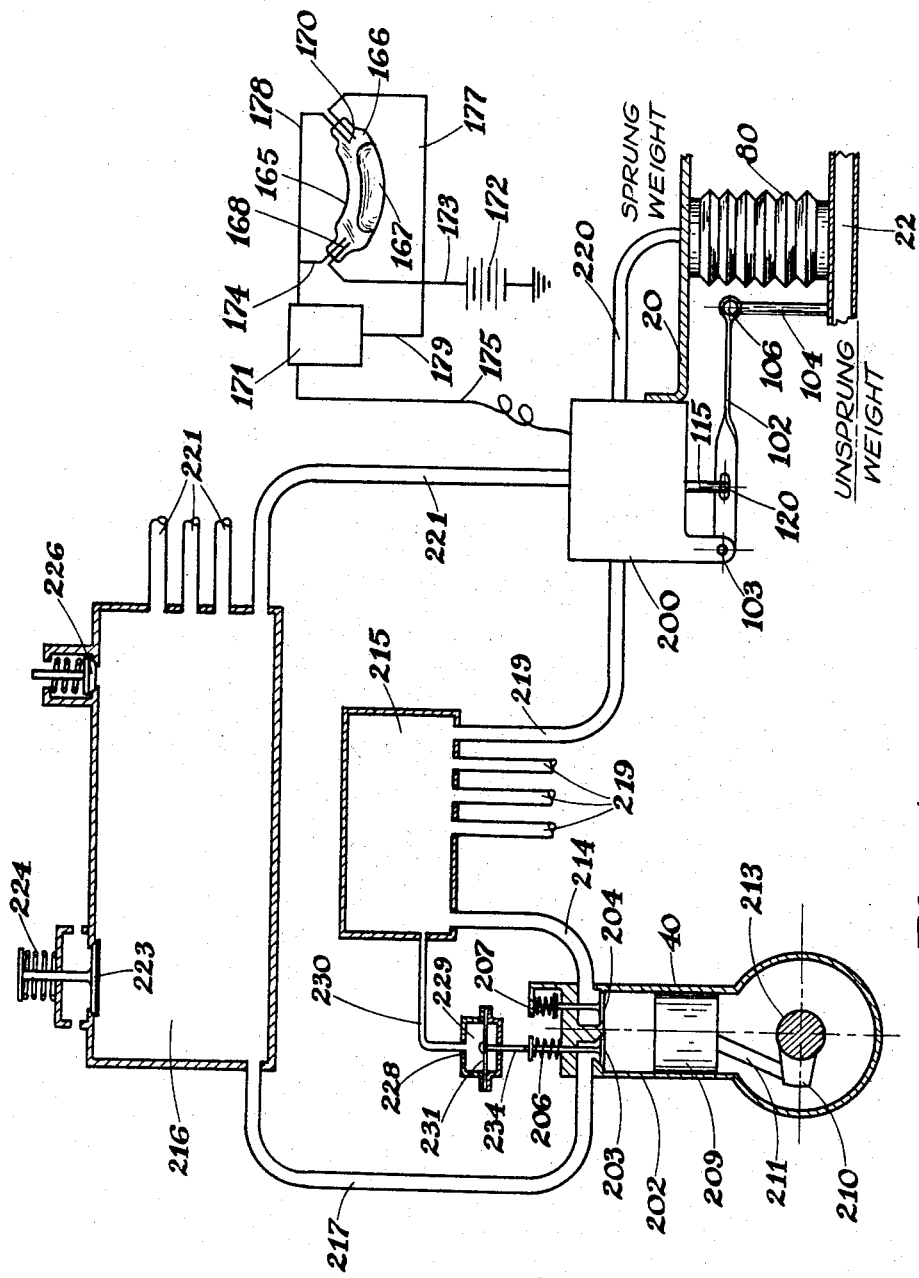

# United States Patent Office 3,404,898
Patented Oct. 8, 1968

3,404,898
CONTROL SYSTEM FOR VEHICLE SUSPENSION
Arthur E. Vogel, Columbus, Ohio, assignor, by direct and mesne assignments, of twenty-five percent each to said Vogel, Robert Dawson, Coshocton, Palmer Fultz and Warren H. F. Schmieding, both of Columbus, Ohio
Continuation of application Ser. No. 201,851, June 12, 1962, which is a division of application Ser. No. 541,337, Oct. 19, 1955, now Patent No. 3,038,739, dated June 12, 1962. This application Sept. 15, 1966, Ser. No. 579,668.
19 Claims. (Cl. 280—6)

ABSTRACT OF THE DISCLOSURE

A controlled vehicle suspension system of the type that includes fluid actuated means operative between the sprung and unsprung weights of the vehicle. The system includes flow control valve means for controlling the flow of fluid to and from said fluid actuated means and valve movement retarding means and is further characterized by means for automatically varying the rate of movement of said retarding means between certain positions of movement thereof. The system is further characterized by a resilient operator operative between said flow control valve means and one of said weights.

---

The present invention relates to suspension systems for vehicles and more particularly to a novel apparatus for automatically controlling such systems.

This application is a continuation of my co-pending application Ser. No. 201,851 filed June 12, 1962, now abandoned, which is a division of my co-pending application Ser. No. 541,337 filed Oct. 19, 1955 now Patent No. 3,038,739 which is a continuation-in-part of my co-pending application Ser. No. 519,079, now abandoned.

In general, the present apparatus is applied to motor vehicles of the type which comprise a sprung weight portion supported by four unsprung weight portions each of which includes a wheel and an independent spring means. The apparatus of the present invention includes a separate control means for each of said spring means arranged to increase and decrease the force exerted by each spring means independently of the other spring means. In addition, each control means is provided with a separate detector means adapted to sense relative movement, from a predetermined suspension configuration, between the sprung and unsprung portions at the particular spring means being controlled.

When the vehicle encounters inertia forces in negotiating a curve, the spring means towards the center of the curve normally unload stored spring energy in a manner which is detrimental to stability and consequently dangerous to the occupants. With the present invention applied, however, the previously mentioned detector means sense any tendency for the inner side of the sprung weight portion of the vehicle to move upwardly from the inner unsprung weight portions such as occurs when the sprung weight portion of a vehicle tends to lean outwardly in a curve. When such tendency is sensed, the appropriate control means are rapidly and automatically actuated, in a controlled manner, to decrease the upwardly directed force exerted by the spring means at the side towards the center of the curve being rounded. Moreover, the appropriate detector means sense the magnitude of relative movement between the sprung and unsprung portions, and command the respective control means to decrease the force exerted by an appropriate amount to maintain said sprung and unsprung portions at said predetermined relative configuration under the various magnitude of centrifugal force to which the vehicle is subjected.

In addition to the above described functioning of the present system, such apparatus is adapted to provide a time lag in the response of said control means to said detector means when normal straight road conditions are being encountered. Accordingly, when road-imposed impacts are encountered at a particular spring means, the unsprung weight portion thereat will depart upwardly and downwardly and effect movements of short time duration without effecting any substantial change in the force exerted by the spring means. When the vehicle is entering a curve, however, it is desirable to effect rapid response of the control means to inertia forces so as to achieve roll stability without the presence of an undesirable transition period at curve entry. Such undesirable transition period would occur, at the time of curve entry, if the above mentioned time delay were retained operative when centrifugal forces are encountered since then the vehicle would start to roll or lean prior to a delayed action of the control means. Accordingly, the above mentioned time delay, required to prevent actuation of the control means when road imposed impacts are encountered, in straight road operation, is automatically rendered inoperative when the vehicle encounters centrifugal forces in entering a curve. Hence the control means will rapidly apply anti-roll corrections at the time of curve entry by the vehicle, yet such control means is non-sensitive to road imposed impacts.

As an additional advantage of the invention, when the vehicle is subjected to various degrees and distributions of static loads, the detector and control means at each of the independent spring means effect an appropriate sensing and produce a corresopnding controlled variation in the force exerted by each spring means to maintain said predetermined suspension configuration at all the spring means of the vehicle and for all magnitudes and distributions of static load to which the vehicle is subjected.

It is another aspect of the present invention to provide a novel hydraulic control system which permits completely independent suspension operation at each of the four unsprung portions of a vehicle, with each of said portions being adapted to sense the particular condition to which it is being subjected, and to make an appropriate corresponding variations in the force exerted by its respective spring means. As a result, improved cornering characteristics and riding comfort are realized under all road conditions to which the vehicle is subjected.

It is another aspect of the present invention to provide a novel hydraulic control system for vehicle suspensions adapted to maintain a normal suspension configuration between sprung and unsprung weight portions of a vehicle, said control system being adapted to vary the force exerted by the spring means of the vehicle by transferring fluid energy to and from such spring means. Such transfer of fluid energy is instituted after a time delay to prevent response of the control system to road imposed impacts of short time duration. After the control system returns the sprung and unsprung weight portions to normal configuration, however, the transfer of fluid is caused to cease without such time delay whereby the sprung and unsprung weights are positively arrested at normal configuration without the occurrence of hunting or ocillation of the system above and below the normal configuration datum.

It is another aspect of the present invention to provide a novel hydraulic control system for vehicle suspensions which system includes inertia responsive switch means that serves to rapidly render inoperative a time delay mechanism in the control system when the vehicle enters a curve so that the control system will effect anti-roll corrections at the outset of the curve. The novel switch means further includes a holding relay for automatically retaining the time delay mechanism inoperative for a time interval subsequent to completion of the curve so that the control system will rapidly remove the previously applied anti-roll correction which was required in the curve.

Hence, the vehicle will not remain in a banked configuration for a period after the vehicle completes the curve and the passengers of the vehicle will not be subjected to transition sensations as the vehicle leaves a curve and enters a stretch of straight road.

Further objects and advantages of the present invention will be apparent from the following description, reference being had to the accompanying drawings wherein preferred forms of embodiments of the invention are clearly shown.

In the drawings:

FIG. 4 is a diagrammatic view of a novel control system and fluid circuit constructed according to the present invention;

Figure 1:
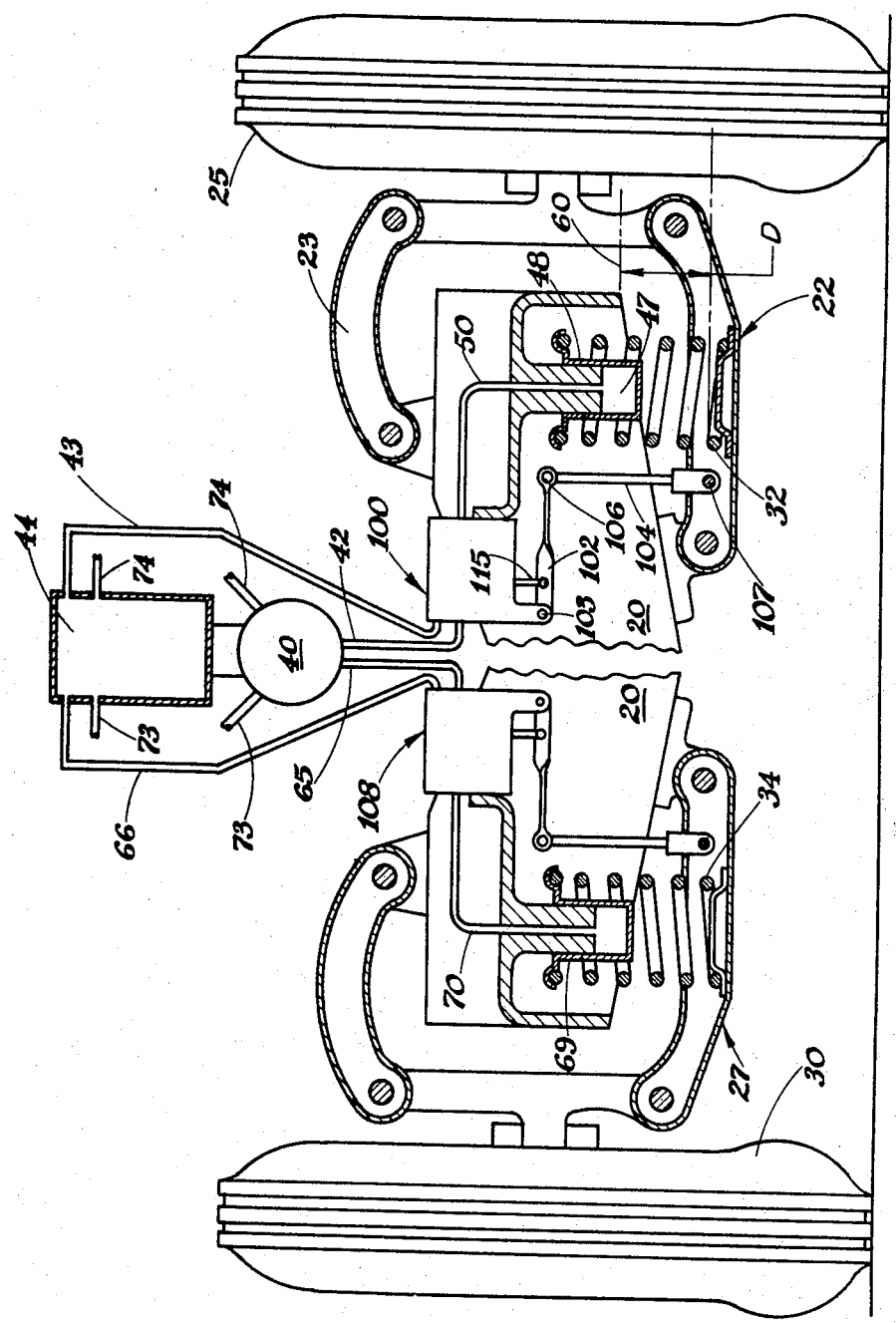
FIG. 1 is a front schematic view of the suspension system of a motor vehicle to which a control system of the present invention has been applied.

Referring in detail to the drawings, FIG. 1 illustrates a controlled vehicle suspension system constructed in accordance with the present invention. The system includes control means 100 and 108 adapted to vary the pressure in a chamber, such as 47, to vary the force exerted by spring means 32 and 34 between the sprung and unsprung weights 20 and 22.

Such force variations are effected in a controlled manner so as to maintain the distance D, between the sprung and unsprung weights, substantially constant for all variations in and distributions of static and inertia loads to which the vehicle is subjected during operation.

Figure 2:
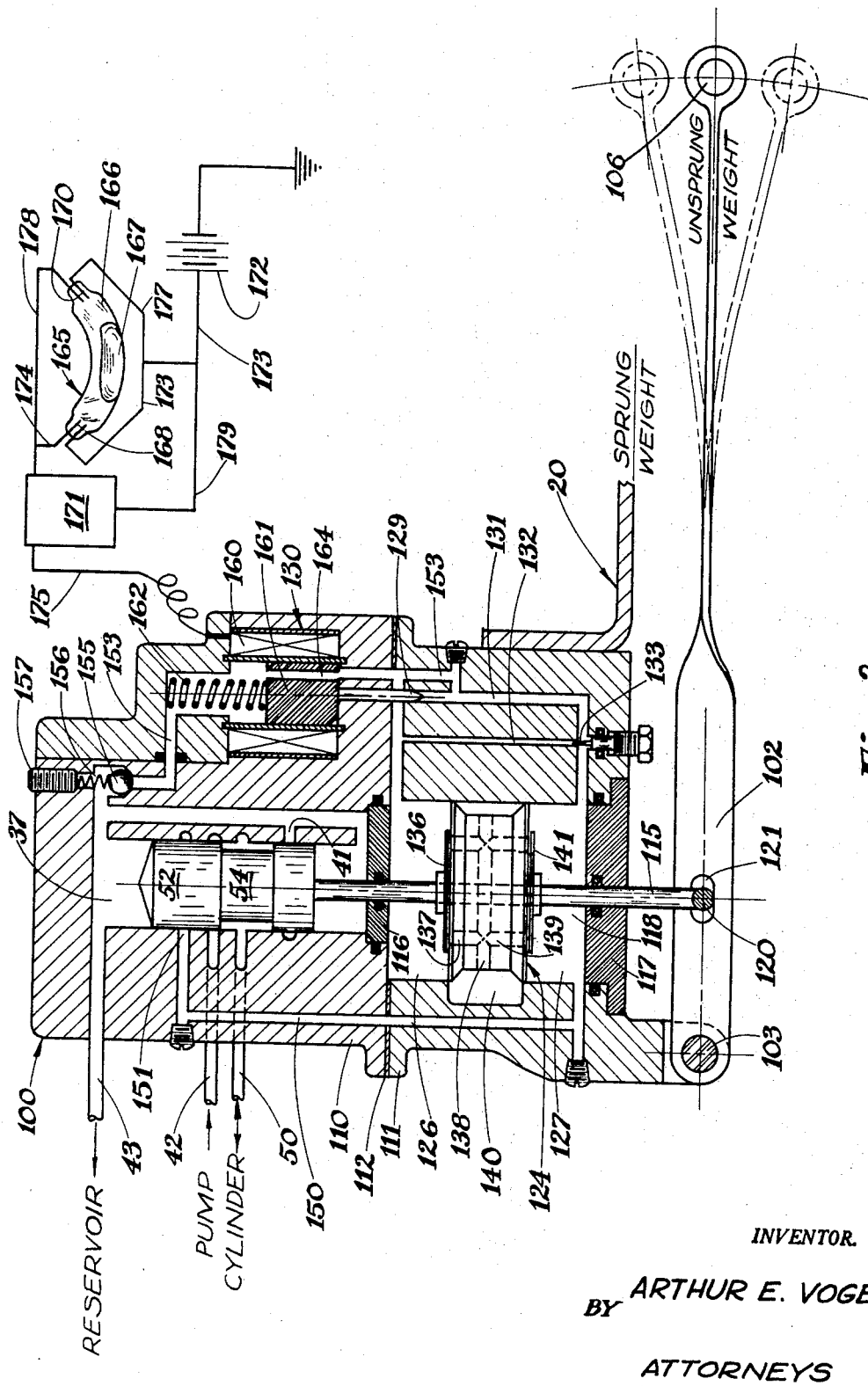
FIG. 2 is a side sectional view of the control means comprising a portion of the system of FIG. 1, the section being taken substantially along a vertical plane through the housing of said control means.

Control means 100 is seen in the sectional view of FIG. 2 which view clearly illustrates the interior mechanism of such control means.

As seen in FIG. 2 control means 100 includes an upper casing portion 110 joined to a lower casing portion 111 at a sealed junction 112.

Control means 100 further includes a spool 52 slideably fitted in a cylinder 37 and provided with a necked portion 54. When spool 52 moves upwardly, a source of high pressure, such as pump 40, delivers fluid through line 50 to the hydraulic means or cylinder 48 since line 42 is then connected to line 50 by necked portion 54 of the spool.

When spool 52 is in the normal position illustrated in FIG. 1, which is the case when no correction for static or inertia load variation is being made by the control means, then the chamber 47 of hydraulic means or cylinder 48 is isolated from both pump 40 and reservoir 44, and the pump and reservoir are isolated from each other, since spool 52 is then effecting isolation of the lines 42, 43 and 50, one from the other.

With continued reference to control means 100, spool 52 is connected to resilient arm 102 by a rod 115 which rod extends slideably through an upper removeable wall 116 and a lower removeable wall 117 of a chamber 118. The lower end of rod 115 is pivotally and slideably connected to resilient arm 102 by a pin 120 extended through a slot 121.

A valve movement retarding means, indicated generally at 124, is mounted on rod 115 and in sealed sliding engagement with the inner wall of chamber 118.

Retarding means 124 is illustrated in the normal position it occupies when the suspension system is in a normal configuration shown in FIG. 1 in which configuration the sprung weight 20 is a normal static load distance D from the unsprung weight 22 and the spool 52 is effecting isolation of lines 42, 43 and 50 one from the other.

When retarding means 124 is urged upwardly or downwardly, from the normal position illustrated, fluid will be moved from an upper chamber portion 126 to a lower chamber portion 127, or from lower chamber 127 to upper chamber portion 126. So long as element 129 of a time delay valve 130 closes passage 131, as illustrated in FIG. 2, fluid moving between chamber portions 126 and 127 must pass through a passage 132 provided with a restrictor 133 which may be formed as an adjustable threaded needle valve 133 carried by lower casing 111 and extended into the lower end of passage 132. It will be understood that the rate of movement of retarding means 124, either upwardly or downwardly from the normal position illustrated, is much slower when the element 129 is closing the larger passage 131 since, in such instance, the flow rate of fluid between chamber portions 126 and 127 is throttled by the restrictor 133. When element 129 of time delay valve 130 is removed from passage 131, however, the fluid can rapidly move between the chamber portions 126 and 127 and the retarding means 124, and spool 52 connected thereto, can move rapidly whereby corrections are rapidly instituted by control means 100.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system than such arm provides the necessary force for continuing the movement of retarding means 124 at the slow rate it must move when time delay valve 130 is closing passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means in rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a distance D apart.

When retarding means 124 is urged upwardly by resilient arm 102, as will occur when sprung weight 20 moves downwardly relative to unsprung weight 22, an upper resilient valve member 136 is maintained closed by fluid pressure whereby fluid cannot pass through the passages 137, 138, or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is open or closed, such retarding means 124 will always move rapidly back to the normal position illustrated, after a correction has been made by the control means. Such rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of retarding means 124 when such means is returning from an upper position until it reaches the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the lower chamber portion 127 without being forced through the restricted passage 132 until retarding means 124 closes by-pass recess 140.

When retarding means 124 arrives at the normal position illustrated, at the completion of a return movement after a correction has been made, the side of retarding means 124 forms a closure for recess 140 in the manner illustrated in FIG. 2.

It is desirable to provide a circulating supply of fluid through upper and lower chamber portions 126 and 127 to keep the system free of dirt as well as to remove air from the system. It is not necessary that the volumetric rate of such circulation be great but it is desirable to provide some positive pressurized flow. Accordingly, a passage 150 is provided with an inlet port 151 confronting the outer surface of spool 52. The other end of passage 150 leads to the lower chamber portion 127. Since inlet port 151 is located intermediate the high pressure pump line 42 and the low pressure portion of cylinder 37, which portion is at reservoir pressure, and since a certain small volume of fluid will always leak along the confronting walls of spool 52 and cylinder 37, such fluid leakage will enter port 151 and flow through passage 150 to the lower chamber portions 126 and 127. To complete the circuit a return passage 153 is provided, with such passage leading from the passage 131 back to the portion of the interior of cylinder 37 which is at reservoir pressure. The outlet end of passage 153 is provided with a fluid actuated check valve 155 which opens at a predetermined pressure against the action of spring 156. A screw 157 is provided for varying the relief pressure at which check valve 155 opens, with such relief pressure being set at some value less than the fluid pressure at inlet port 151 of inlet passage 150 in order to provide the desired circulation through the time delay portion of the system.

It will be understood that the pressure available for pressurizing chambers 126 and 127 will depend on the location of port 151 is centrally located between line 42 and the top of spool 52, and if the reservoir pressure is atmospheric, then the pressure available at port 151 will be approximately one half the pressure existing in high pressure line 42.

Referring next to the time delay control valve 130 of FIG. 2, such valve includes a stationary solenoid 160 surrounding a moveable core 161 which core carries element 129. A spring 162 constantly urges core 161 and element 129 towards the closed position illustrated. When solenoid 160 is energized, however, core 161 is moved upwardly by the magnetic field of the solenoid towards a central position therein whereby the element 19 opens the larger passage 131 and the time delay mechanism is rendered inoperative in the manner previously described.

A passage 164 is provided through core 161 for the passage of fluid through the core whereby both the upper and the lower end of the core are subjected to the same fluid pressure. Hence the time delay control valve 130 is balanced with respect to fluid pressure of the system and movement thereof will be effected only by the action of spring 162 and solenoid 160.

The system of FIG. 2 is provided with an inertia responsive control means to rapidly render the time delay mechanism inoperative when the vehicle is suddenly subjected to a horizontally exerted force such as is the case when the vehicle enters a curve, or at the outset of a braking or accelerating operation. In these instances of vehicle operation it is desirable to rapidly institute an anti-roll correction at the entry of a curve, or to rapidly resist longitudinal pitching or "nose dive" of the front of the vehicle when the brakes are applied, or to rapidly resist longitudinal pitching of the vehicle during rapid acceleration thereof. By rapidly instituting the correction to be made by the control means, through rendering inoperative the time delay mechanism, lower control means pressures are required to effect stability and the passengers of the vehicle will not be subjected to unpleasant transition sensations as would be the case were the vehicle permitted to materially proceed into a roll or pitching movement before the appropriate correction is instituted by the control means 100.

With continued reference to FIG. 2, a horizontally disposed mercury switch is generally indicated at 165. Such switch includes a tube 166 having inclined opposite ends provided with a first pair of contacts 168 and a second pair of contacts 170. A source of electric energy 172 is connected to one of the contacts 168 by wire 173 and the other of the contacts 168 is connected by wire 174 to a holding relay 171, later to be described herein, which relay is in turn connected to solenoid 160 by the wire 175. At the other end of tube 166 one of the contacts 170 is connected to the source of electric energy 172 by the wire 177 and the other of the contacts 170 is connected to the holding relay by the wire 178.

When the quantity of mercury 167 connects either the contacts 168 or the contacts 170 the solenoid 160 is actuated whereby the time delay mechanism is rendered inoperative. It will be understood that when the longitudinal axis of mercury switch 165 is disposed transversely to the longitudinal axis of the vehicle the mercury switch 165 will sense centrifugal force and render inoperative the time delay mechanism when the vehicle encounters a curve.

The same control means 100 can be also utilized to control longitudinal pitching or "nose dive" of the vehicle when the brakes are applied in slowing down or stopping. In such instances it is desirable to render inoperative the time delay mechanism of control means 100 so that an anti-pitch correction will be rapidly instituted before the vehicle has materially progressed into a pitched attitude. To accomplish this a brake operated switch 240, illustrated in FIG. 7 and later to be described, may be connected in parallel with the mercury switch 165. Hence a single control circuit, using both mercury switch 165 and brake operated switch 240, can be utilized with control means 100 whereby such control means 100 will effect both anti-roll corrections and anti-pitch corrections.

Figure 3:
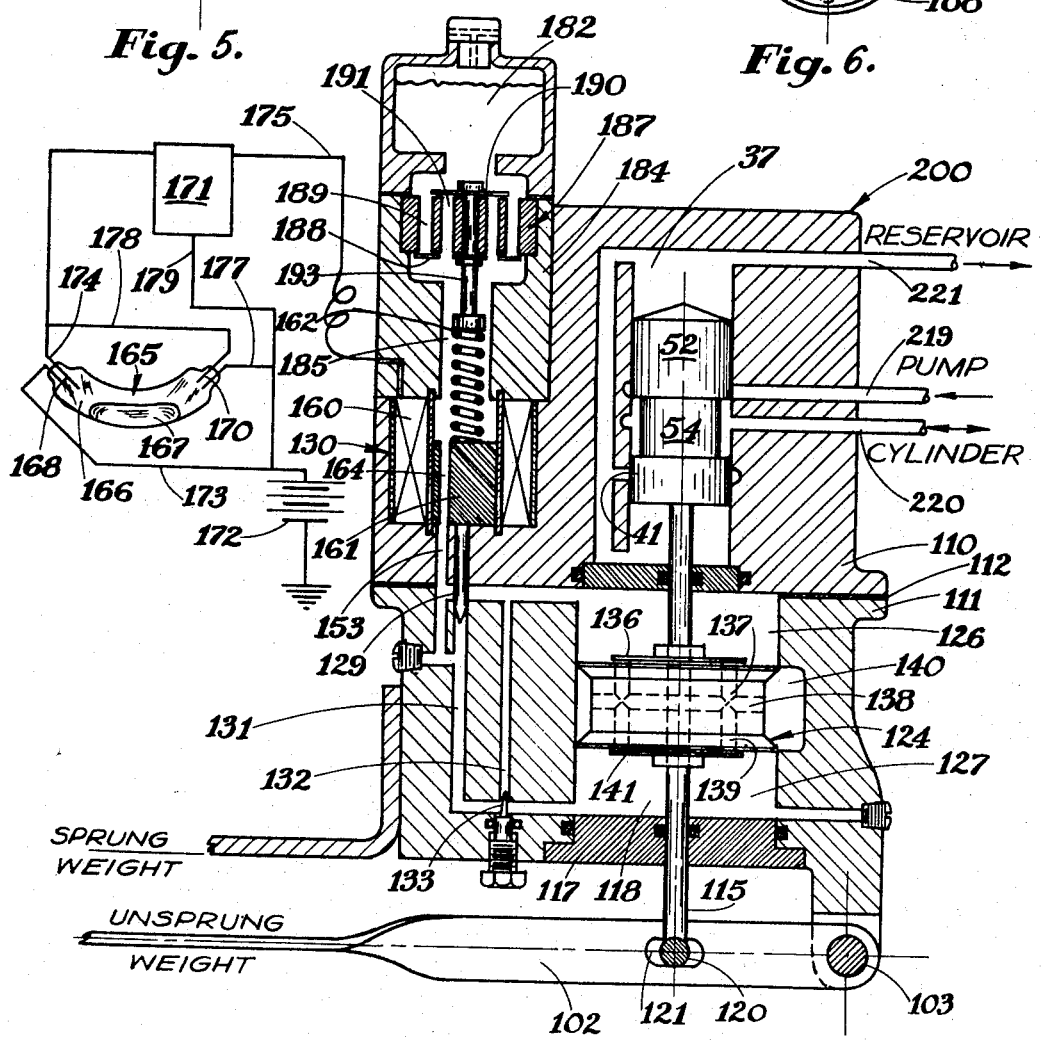
FIG. 3 is a side sectional view of a control means constructed according to the present invention and utilized with a control system comprising a second aspect of the present invention. The section is taken substantially along a vertical plane through the housing of said control means.

Reference is next made to FIG. 3 which illustrates still another aspect of the present invention. Such view is a section of a control means 200 adapted for use in a control for a suspension system wherein a compressible fluid, such as air, is utilized. In general, the control means 200 is adapted to vary the fluid pressure in a sealed flexible casing or air spring such as the casing or chamber 80, or the combined coil spring and sealed flexible casing unit 86.

The control means 200 functions to control the vehicle in substantially the same manner as control means 100 previously described. The structure of control means 200 differs, however, from that of control means 100, since, in the former the main valve mechanism, provided by spool 52, is used to regulate air and the retarding means 124 is operated in hydraulic liquid in chamber 118. Accordingly, the cylinder 37 must be completely sealed from the hydraulic chamber 118. Moreover, a hydraulic reservoir 182 is added to control means 200 to maintain fluid in the hydraulic chamber 118. Hence the air, used as the control fluid, is prevented from leaking into the hydraulic fluid used in connection with the time delay mechanism.

The control means 200 is suitable for use with the air spring system illustrated in FIG. 4, later to be described, and, accordingly, the air lines 219, 220, and 221 are designated by identical numbers in each of the FIGS. 3 and 4 in order to more clearly relate the control means 200 in the other components of a suitable suspension control system in which such control means can be utilized.

It should be further pointed out that each of the elements of control means 200 which is identical to a corresponding element of control means 100 has been designated by an identical numeral.

A solenoid 160 and core 161 of a time delay valve 130 are, as in the case of control means 100, mounted in a recess in an upper casing portion 110. A separate casing portion 184 forms a vertical passage 185 which connects reservoir 182 with the chamber portions 126 and 127 by means of passage 164 through core 161 and passage 153.

For controlling the flow of liquid from reservoir 182 to the chamber portions 126 and 127, a fluid actuated valve unit, indicated generally at 187, is mounted in casing portion 184 below the reservoir 182. Fluid actuated valve unit 187 further provides an escape for any air bubbles which may be present in the hydraulic liquid contained in the control means 200. Such unit 187 includes a lower resilient valve member 188 which prevents the movement of liquid from chamber portions 126 and 127 through passages 189 to reservoir 182 when retarding means 124 is actuated. An upper resilient valve member 190 serves to retain passages 191 closed against fluid flow to reservoir 182 up to a predetermined fluid pressure required in chamber portions 126 and 127 for proper operation of the time delay mechanism located therein. The lower resilient valve member 188 is arranged to permit free passage of hydraulic liquid from reservoir 182 through passages 189 to chamber portions 126 and 127 so that such chambers are always maintained full of liquid notwithstanding any slight leakage which may be present in the hydraulic system.

Figure 5:
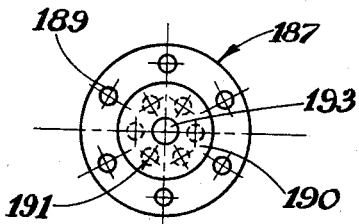
FIG. 5 is a top elevational view of a fluid actuated valve unit comprising a portion of the control means of FIG. 3.
Figure 6:
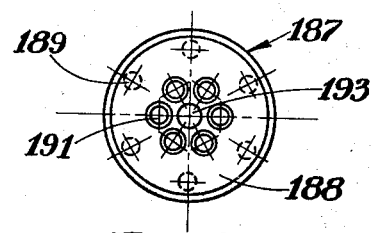
FIG. 6 is a bottom elevational view of the fluid actuated valve unit of FIG. 5.

FIG. 5 is a top view of fluid actuated valve unit 187 showing upper resilient valve member 190 overlying the passages 191 but being of lesser diameter than the unit whereby the upper ends of passages 189 are uncovered. FIG. 6 is a bottom view of valve unit 187 showing the lower resilient member 188 underlying the passages 189 and provided with holes corresponding with the locations of passages 191 whereby the lower ends of such passages are always open to the entry of fluid.

The upper and lower resilient valve members 188 and 190 are mounted to the upper and lower surfaces of the body of valve unit 187 by means of a shouldered pin 193 passing centrally through the body of the unit, with such pin being extended vertically downwardly into passage 185 to provide a retainer for a spring 162 adapted to constantly urge time delay valve 130 towards the closed position illustrated.

Referring now to FIG. 4, here again the sealed flexible casing or chamber 80 is disclosed between the unsprung weight 22 and the sprung weight 20. The resilient arm 102 is connected to the rod 102 by the pivot pin 106. This rod 104 is suitably attached to the unsprung weight 22. The rod 115 connected to retarding means 124 is fastened to resilient arm 102 by a pin 120, and the arm 102 is connected to the valve casing 200 by pivot pin 103.

For the sake of simplicity, the compressor 40, is shown as of the reciprocating type including a cylinder 202, having an air inlet valve 203 and an air outlet valve 204. Valve 203 is upwardly urged towards the closed position by a spring 206, and valve 204 is downwardly urged towards the closed position by a spring 207. The compressor also includes a reciprocating piston 209 which is connected with a crank shaft 210 by a connecting rod 211. The shaft of the compressor is shown at 213. Compressed air is forced through the outlet valve 204 and line 214 to a high pressure reservoir 215. Air is fed to the compressor through valve 203 from a relatively low pressure reservoir 216 via line 217.

A control means 200 is provided for each of the sealed casings 80 and each is fed from the high pressure reservoir 215 through a line 219, control means 200, and line 220. Air is exhausted from each of the casings 80 to the pipe 220, control means 200, and line 221, one line being provided for each of the four chambers 80.

As previously described, it is desirable at times to quickly exhaust or partly exhaust the chamber 80 and, as previously described, this is accomplished by a control means like that shown at 200, and, as previously described, at this time the mercury switch 165 will have energized the solenoid operated time delay valve 130 within the control means 200.

Instead of exhausting the air from the chamber 80 to atmosphere, the lines 221 are connected to the relatively low pressure reservoir 216. This reservoir is provided with an inlet valve 223 which is urged to closed position by a spring 224. Such spring if of light construction and is merely used to hold the valve closed in the event that the air within the reservoir 216 is at atmospheric pressure. Normally, however, the pressure within reservoir 216 is substantially above atmospheric pressure. Air cannot escape reservoir 216 except through line 217 or a high pressure relief valve 226. As an example, the air pressure normally existing within the relatively low pressure reservoir 216 is at forty pounds per square inch, that in the chamber 80 is approximately 80 pounds per square inch, and that in the high pressure reservoir 215 approximately 120 pounds per square inch. Far less energy is expended in raising the pressure from 40 pounds per square inch to 120 pounds per square inch than would be expended in increasing the pressure of atmospheric air to 120 pounds per square inch. Thus by maintaining a pressure of 40 pounds per square inch, for example, in the relative low pressure reservoir 216, the system is operated more economically. The maximum high pressure within reservoir 215 can be controlled by a controller 228 which includes a chamber 229 connected by a line 230 to the reservoir 215. One of the walls 231 of the controller 228 is flexible and a rod 234 is engageable with the top of inlet valve 203. When the pressure within the reservoir 215 attains the desired maximum, valve 203 will be forced downwardly by the diaphragm 231 and rod 234 to partly open the inlet valve 203. By partially opening valve 203, and preventing it from returning to its seat, the air is merely oscillated between the line 217 and the cylinder 202. After the requirements of chambers 80 cause the pressure in high pressure reservoir 215 to drop below the maximum at which the controller 228 opens the intake valve 203, then the intake valve 203 will be returned to its seat and compressor 40 will resume normal operation and supply air to the high pressure reservoir 215.

Figure 7:
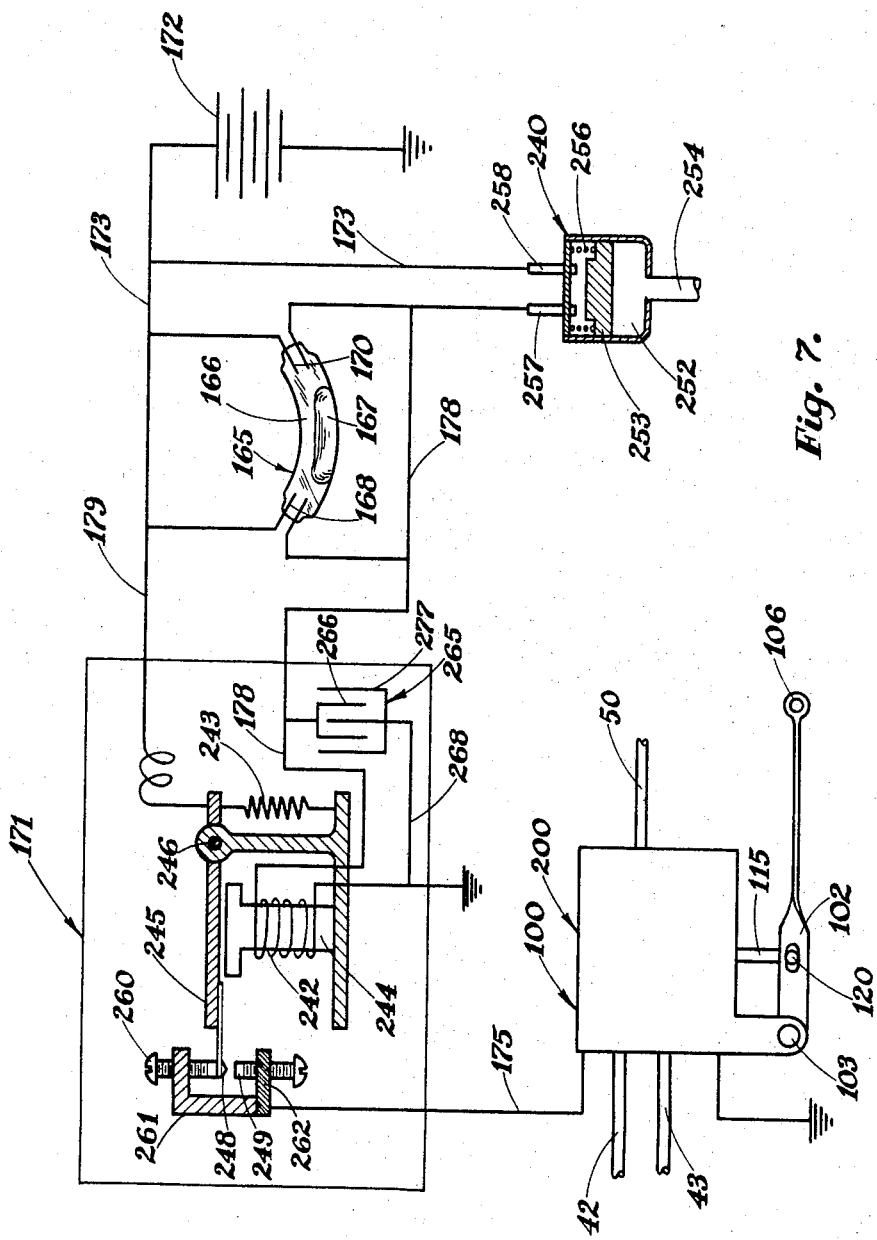
FIG. 7 is a diagrammatic view showing a novel electric control apparatus utilized with the control means of the present invention and comprising still another aspect thereof.

Reference is next made to FIG. 7 which diagrammatically illustrates an electrical sensing apparatus adapted to operate the time delay mechanisms of the previously described control means 100 or 200. A mercury switch 165 is provided with a pair of contact points 168 at one inclined end of a horizontal tube 166 and a second pair of contacts 170 at the other inclined end of horizontal tube 166. When the quantity of mercury connects either of the pair of contacts 168 or 170, which occurs when the vehicle encounters centrifugal force at curve entry, a solenoid 242 of holding relay 171 is energized and a core 244 becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 242 by means of wires 173 and 178. The other mercury switch contacts 170 connect source 172 with solenoid 242 by means of wires 173 and 178.

A fluid actuated switch 240 is provided in parallel with mercury switch 165 to render inoperative the electrically operated time delay valve 130 located within the control means 100 or 200 when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized piston 253 moves upwardly against the action of a return spring 256 whereby piston 253 electrically connects a pair of contacts 257 and 258. The contacts 257 and 258 energize solenoid 242 of holding relay 171 with the source of electric energy by means of the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within control means 100 or 200.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIGS. 2 and 3, the element 129 opens the larger passage 131 whereby retarding means 124, and hence spool 52, will move rapidly to quickly institute an anti-roll or anti-pitch correction as required.

With continued reference to FIG. 7, when the vehicle leaves a curve and enters a stretch of straight road it is desirable to continue to maintain the time delay mechanism inoperative for a period of time after the centrifugal force has ceased and the mercury switch 165 has broken contact, in order that the control means 100 or 200 can rapidly, without time delay, make corrections in the chambers 47 or 80, FIGS. 1 and 4, which corrections are required because centrifugal force is ceasing and the unequal spring forces, required in the curve to levelize the vehicle, are no longer required in the straight stretch of road being entered. Hence it is desirable to maintain the time delay mechanism inoperative and hence the solenoid 160 of the time delay switch 130, FIGS. 2 and 3, the solenoid 242 of the holding relay 171 must both be maintained energized.

To maintain solenoids 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 267 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in the control means 100 or 200 will remain connected to the source 172 and receive electric current therefrom. When the closed switch 165 and 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condenser 265 discharges the arm 245 is moved upwardly against stop 260 whereby time delay valve 130 is closed and the control means 100 or 200 is rendered non-responsive to road imposed impacts of short time duration in the manner previously described.

It will be understood that each of the control means 100 or 200 of the present invention can be applied to each of the four wheels of a motor vehicle whereby anti-roll control, as well as corrections for variations in static weight changes, if effected at each of the four wheels of the vehicle. As an alternative, if it is desired to effect anti-roll control at only say the front wheels of the vehicle, then a control means 100 or 200 would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a control means at each of the four wheels, but only the control means 100 or 200 at the right front wheel and the control means 100 or 200 at the left front wheel would rapidly institute anti-roll corrections in the manner described herein.

While the forms of the present invention as herein disclosed constitute preferred forms, it is to be understood that other forms might be adopted, all coming within the scope of the claims which follow.

I claim:

1. In a suspension system for a vehicle having a sprung weight portion and an unsprung weight portion connected by resilient means, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means movably carried in said chamber and arranged to impart movement to fluid therein, said retarding means separating said chamber into first and second chamber portions; means operatively connecting said valve means to said retarding means and to the other of said sprung and unsprung weight portions; first conduit means communicating with said first and second chamber portions for the normal flow of fluid between said chamber portions during normal slow movement of said valve means and retarding means; second conduit means in parallel communication with said first conduit means for an increased flow of fluid between said chamber portions that permits rapid movement of said valve means and retarding means to effect rapid variations in said force exerted by said resilient means; flow obturating means in said second conduit means; and condition responsive means for automatically operating said flow obturating means to open said second conduit means.

2. Apparatus defined in claim 1 wherein said first conduit means includes a flow restrictor formed by an adjustable throttle.

3. Apparatus defined in claim 1 characterized by said means for operatively connecting said valve means to said other of said sprung and unsprung portions including a resilient element.

4. Apparatus defined in claim 1 characterized by said retarding means being formed as a member having a first wall and a second wall, a first passage means through said member having an inlet port in one of said walls and an outlet port in the other of said walls, a second passage means through said member having an inlet port in the other of said walls and an outlet port in said one wall, a first closure for said first passage, said first closure being openable to fluid flow in one direction, a second closure for said second passage, said second closure being openable to fluid flow in the other direction, and certain of said first and second closures being resiliently retained in a closed position at pressures less than a predetermined fluid pressure.

5. In a suspension system for a vehicle having a sprung weight portion and an unsprung weight portion connected by resilient means including a control chamber containing a non-compressible fluid, the combination of fluid actuated means for varying the force exerted by said resilient means between said portions when the distance between said portions tends to vary from a normal configuration; a fluid pump for delivering pressurized fluid to said fluid actuated means; means forming a zone of relatively low pressure for receiving fluid from said fluid actuated means; a control means mounted on one of said sprung and unsprung weight portions and including a chamber, said control means including a valve for controlling the flow of non-compressible fluid to and from said chamber; a valve movement retarding means movably carried in said chamber and arranged to impart movement to fluid therein, said retarding means separating said chamber into first and second chamber portions; means operatively connecting said valve means to said retarding means and to the other of said sprung and unsprung weight portions; first conduit means communicating with said first and second chamber portions for the normal flow of fluid between said chamber portions during normal slow movement of said valve means and retarding means; second conduit means in parallel communication with said first conduit means for an increased flow of fluid between said chamber portions that permits rapid movement of said valve means and retarding means to effect rapid variations in said force exerted by said resilient means; flow obturating means in said second conduit means; and condition responsive means for automatically operating said flow obturating means to open said second conduit means.

6. Apparatus defined in claim 5 wherein said first conduit means includes a flow restrictor formed by an adjustable throttle.

7. Apparatus defined in claim 5 characterized by said means for operatively connecting said valve means to said other of said sprung and unsprung portions including a resilient element.

8. Apparatus defined in claim 5 characterized by said flow obturating means being provided with electrically actuated valve means for controlling the flow of fluid through said second conduit means and energized by said condition responsive means.

9. Apparatus defined in claim 5 characterized by means forming a passage for fluid through said retarding means; and a fluid actuated check valve for said passage through said retarding means for preventing the passage of fluid through said retarding means when said retarding means is moving fluid through certain of said restrictors.

10. Apparatus for automatically controlling the suspension system of a vehicle, said vehicle being of the type wherein unsprung weight portions are connected to a sprung weight portion by a resilient means including a flexible chamber containing a gas, which apparatus comprises; detector means for said unsprung portions, said detector means serving to sense relative movement, between said unsprung portions and said sprung portion away from a normal configuration; and control means for said resilient means, said control means being variably responsive to said detector means for varying the force effect in said resilient means, the magnitude of variation in said force effect being produced in proportion to the magnitude of force imposed on said vehicle to maintain said weight portions at said normal configuration under various forces being encountered, said control means including a flow control valve means for controlling the flow of gas to and from said flexible chamber; valve movement retarding means connected to said flow control valve means for movement therewith and including a cylinder, a piston mounted for reciprocation in the cylinder between a normal position, an up position, and a down position; and a retarding means controller operatively associated with the retarding means for automatically effecting rapid return movement of said retarding means and valve means from said up and down positions to said normal position as compared to a slower departure movement of said retarding means and valve means from said normal position to said up and down position.

11. Apparatus for automatically controlling the suspension system of a vehicle comprising, in combination, unsprung weight portions connected to a sprung weight portion by a resilient means including a flexible chamber containing a gas and a resilient spring element, said chamber and spring element cooperating to form said resilient means; detector means for said unsprung portions, said detector means serving to sense relative movement between said unsprung portions and said sprung portion, away from a normal configuration; control means for said resilient means, said control means being variable responsive to said detector means for varying the force effect in said resilient means, the magnitude of variation in said force effect being produced in proportion to the magnitude of load imposed on said vehicle to maintain said weight portions at said normal configuration under various loads imposed on said vehicle; valve movement retarding means connected to said flow control valve means and including a cylinder, a piston mounted for reciprocation in the cylinder between a normal position, an up position, and a down position; and a retarding means controller associated with the retarding means for automatically effecting rapid return movement of said retarding means and valve means from said up and down positions to said normal position as compared to a slower departure movement of said retarding means and valve means from said normal position to said up and down positions.

12. A vehicle suspension system of the type having sprung and unsprung weight portions comprising, in combination, means forming a resilient air chamber operative between said weight portions; means for supplying pressurized air to said resilient chamber; flow control valve means for said pressurized air for maintaining a predetermined height distance between said sprung and unsprung weight portions; a resilient operator connected between said flow control valve means and one of said weight portions; valve movement retarding means connected to said flow control valve means and including a cylinder and a piston mounted for reciprocation in the cylinder between a normal position, an up position, and a down position, and a retarding means controller associated with said retarding means for automatically effecting rapid return movement of said retarding means and valve means from said up and down positions to said normal position as compared to a slower departure movement of said retarding means and valve means from said normal position to said up and down positions.

13. The apparatus defined in claim 12 wherein said retarding means controller includes check valve means in said piston.

14. The apparatus defined in claim 12 wherein said retarding means controller includes a first passage means between opposite sides of said piston, a second passage means between opposite sides of said piston, and a check valve for a respective one of said passage means.

15. The apparatus defined in claim 12 wherein said retarding means controller includes a first passage means between opposite sides of said piston, a second passage means between opposite sides of said piston, and a check valve for a respective one of said passage means; and wherein said cylinder includes an inner surface provided with a recess communicating with said first and second passage means.

16. A vehicle suspension system having sprung and unsprung weight portions comprising, in combination, a resilient means including a metal spring and pressurized chamber in cooperative force transmitting disposition between said weight portions; reservoir means for supplying pressurized fluid to said pressurized chamber; flow control valve means for said pressurized fluid for maintaining a predetermined height differential between said sprung and unsprung weight portions; valve movement retarding means connected to said flow control valve means and including a cylinder, a piston mounted for reciprocation in the cylinder between a normal position, an up position, and a down position, and a retarding means controller associated with said retarding means for automatically effecting rapid return movement of said retarding means and valve means from said up and down positions to said normal position as compared to a slower departure movement of said retarding means and valve means from said normal position to said up and down positions.

17. The apparatus defined in claim 16 wherein said retarding means controller includes check valve means in said piston.

18. The apparatus defined in claim 16 wherein said retarding means controller includes a first passage means between opposite sides of said piston, a second passage means between opposite sides of said piston, and a check valve for a respective one of said passage means.

19. The apparatus defined in claim 16 wherein said retarding means controller includes a first passage means between opposite sides of said piston, a second passage mean between opposite sides of said piston, and a check valve for a respective one of said passage mean; and wherein said cylinder includes an inner surface provided with a recess communicating with said first and second passage means.

References Cited
UNITED STATES PATENTS

| | | |
|---|---|---|
| 1,641,640 | 9/1927 | Myers. |
| 1,664,510 | 4/1928 | Hughes. |
| 2,125,083 | 7/1938 | Penney _____ 188—100 X |
| 2,241,826 | 5/1941 | Rabe. |
| 2,490,311 | 12/1949 | Rostu _____ 280—124 |
| 2,576,637 | 11/1951 | Patriquin _____ 188—100 |

PHILIP GOODMAN, *Primary Examiner.*